United States Patent [19]
Evans, deceased

[11] 3,740,824
[45] June 26, 1973

[54] METHOD OF AND APPARATUS FOR OPENING CAP-EQUIPPED DRUMS AND THE LIKE

[76] Inventor: Llewellyn W. Evans, deceased, late of 1 Greenwood Court, Orinda, Calif. by Agnes J. Evans, executrix

[22] Filed: Nov. 15, 1971

[21] Appl. No.: 198,888

Related U.S. Application Data

[62] Division of Ser. No. 761,350, Sept. 20, 1968.

[52] U.S. Cl. ................. 29/426, 113/121 R, 220/24
[51] Int. Cl. ........................................... B23p 19/00
[58] Field of Search ................. 29/401, 426; 30/17, 30/21.5, 106; 220/24; 113/120 DD, 121 R, 121 A, 121 C

[56] References Cited
UNITED STATES PATENTS

| | | | |
|---|---|---|---|
| 1,446,158 | 2/1923 | Clymer et al. | 113/121 R |
| 1,969,868 | 8/1934 | Wright | 30/17 |
| 2,060,145 | 11/1936 | Vogel | 113/121 R X |
| 2,060,888 | 11/1936 | Newman | 113/121 R UX |
| 2,209,209 | 7/1940 | Ruby | 29/426 |
| 2,648,128 | 8/1953 | Tanking | 30/17 |
| 2,749,612 | 6/1956 | Blue | 30/21.5 X |
| 2,943,386 | 7/1960 | Katz | 29/401 |
| 3,008,231 | 11/1961 | Caproni | 30/17 |
| 3,084,826 | 4/1963 | Ericson | 113/121 R X |

Primary Examiner—Charlie T. Moon
Attorney—Gardner & Zimmerman

[57] ABSTRACT

Method of and apparatus for opening drums and other containers by removing the closure caps from the filler openings thereof. Typically, such a filler opening is located in the top wall or head of the drum, and it is an annular rim-equipped opening through which the closure cap extends and within which it is confined by laterally extending annular flanges respectively disposed inside and outside of the drum on opposite sides of the rim.

7 Claims, 7 Drawing Figures

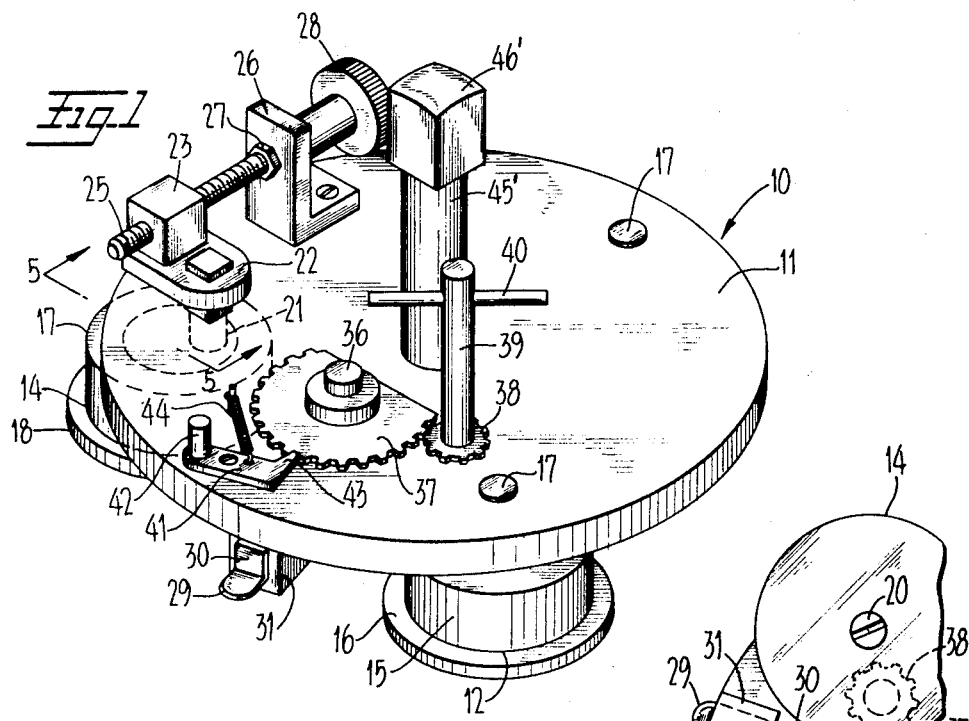
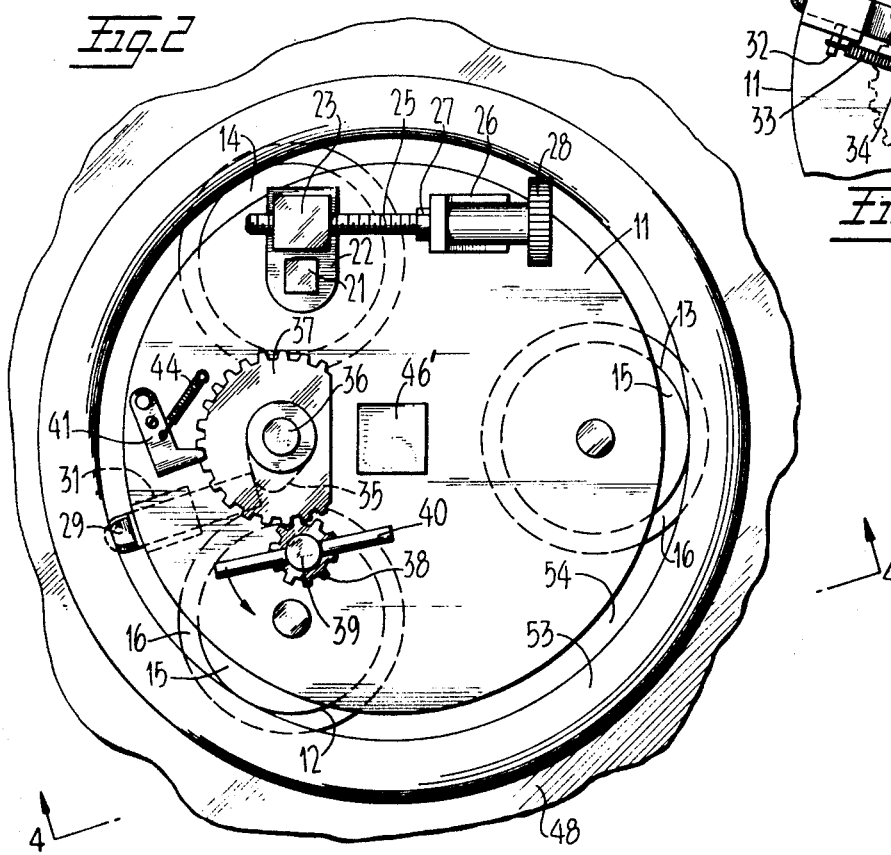

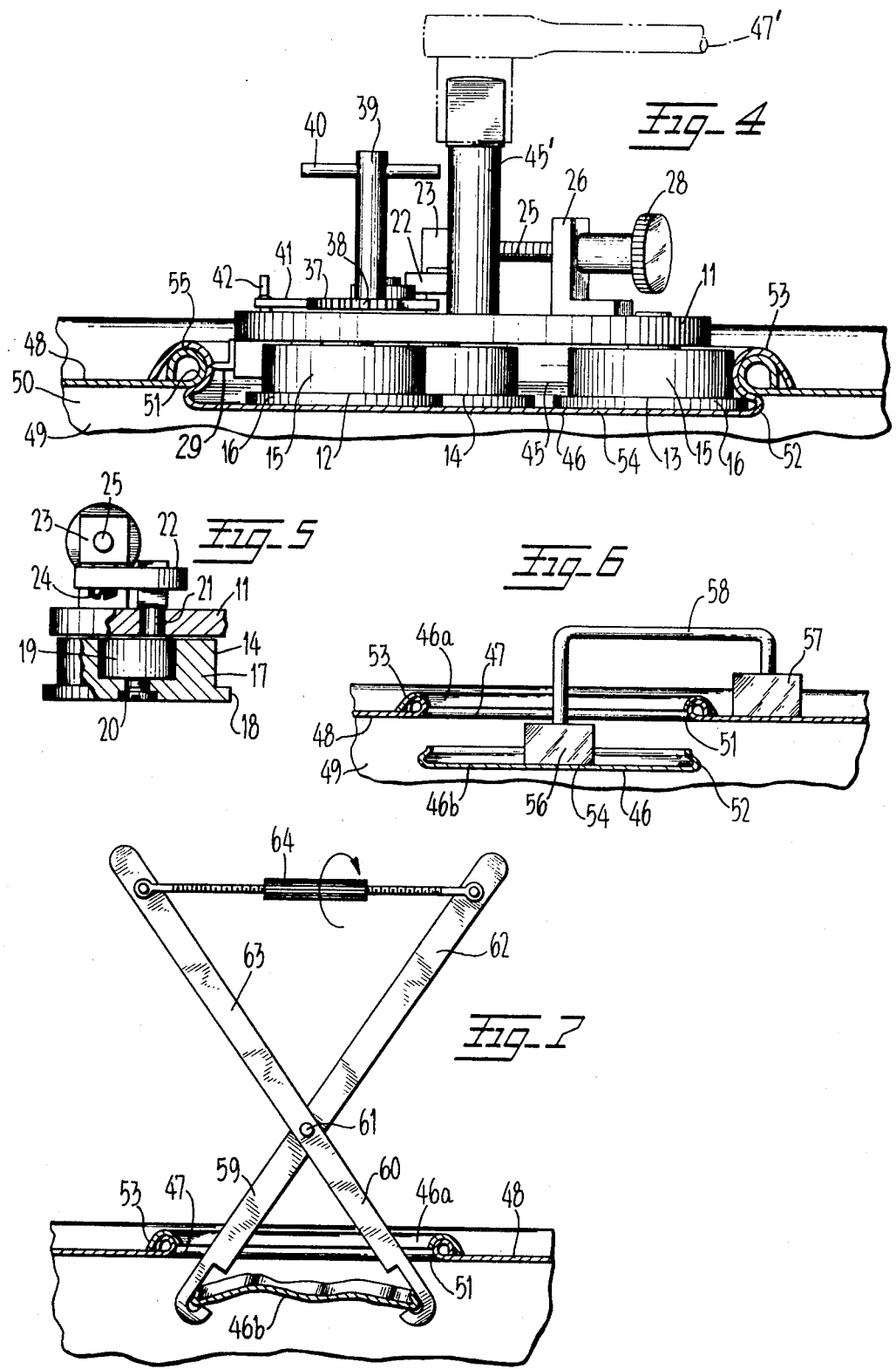

METHOD OF AND APPARATUS FOR OPENING CAP-EQUIPPED DRUMS AND THE LIKE

This is a division of application Ser. No. 761,350, filed Sept. 20, 1968.

The method of opening such drum includes the steps of enforcing substantial circularity upon the cap along the ring-shaped area thereof in engagement with the annular rim, and of then cutting the cap along such area, the enforced circularity of which prevents inadvertent cutting of the drum head and the opening-defining rim thereof. After the cap is so cut, the outer portion thereof is removed and the remaining portion, while being held, is pressed or driven downwardly through the opening to free the cap therefrom. The cap is then deformed or collapsed while held within the drum to reduce its size and thereby permit it to be withdrawn through the opening. The apparatus includes a plurality of rollers that lie along a circle and one of which is adjustable inwardly and outwardly relative to the circumference of such circle to enable the rollers to be brought into rolling engagement with the cap to enforce such circularity thereon. An adjustable knife provided by the apparatus is engageable with the cap to cut the same along the area of circularity enforced thereon by the rollers.

This invention relates to a method of an apparatus for opening containers and, more particularly, to a method of and apparatus for removing the closure cap from the filler opening of a drum or like container having an annular rim-equipped filler opening through which the cap extends and within which it is confined by laterally extending annular flanges respectively disposed along opposite sides of the rim interiorly and exteriorly of the drum.

Large metal containers or drums are sufficiently expensive to make reuse thereof economically attractive provided that they are not damaged when opened to remove the contents thereof. One type of drum that has posed a problem in this respect has a top wall or head permanently secured to the side walls of the drum and provided centrally with a rim-equipped annular opening through which the drum is filled and which opening is then closed with the cap or lid therefor extending through the opening in substantially contiguous relation with the rim thereof. After being so positioned within the opening, the cap is deformed so as to have laterally extending annular flanges disposed along each side of the rim both interiorly and exteriorly of the drum so as to confine the cap within the opening. Such drums often have a sterile interior so as to protect a food product or other commodity shipped therewithin, and the inner surfaces of the drum may be coated to protect it and/or the contents thereof from contamination.

It will be appreciated that removal of a closure cap of this type is difficult, and in the past the common technique used to open such drums has been to cut through the side wall thereof along the head to remove it in its entirety, thereby destroying the drum and preventing reuse thereof. It should be observed that it has not been feasible to deform the outer annular flange of the closure cap and drive it into the interior of the drum because its presence therewithin would contaminate any product carried by the drum; and further, the rim-equipped filler opening in the head of such drum is usually not perfectly circular, nor then is the ring-shaped portion of the cap contiguously related thereto, so that direct cutting of the cap is not certain without the corresponding likelihood of cutting and thereby damaging the drum head or rim of the opening therethrough.

In view of the foregoing, an object of the present invention is to provide an improved method of and apparatus for opening containers of the character described by removing the closure caps from the rim-equipped openings thereof. Another object of the invention is that of providing a method and apparatus of the character described in which such removal of the closure cap is accomplished quickly and with facility, without contaminating the interior of the drum or product contained therewithin, and without damaging the drum so that it can be reused. Additional objectives and advantages will appear as the specification develops.

Embodiments of the invention are illustrated in the accompanying drawings in which:

FIG. 1 is a perspective view of apparatus embodying the invention;

FIG. 2 is a top plan view showing the apparatus in operative relation with the closure cap of a drum;

FIG. 3 is an enlarged, broken bottom view in elevation illustrating the cutting mechanism;

FIG. 4 is a transverse sectional view taken along the line 4—4 of FIG. 2;

FIG. 5 is a broken, transverse sectional view taken along the line 5—5 of FIG. 1;

FIG. 6 is a broken, transverse sectional view through the center of the closure-equipped opening showing the step of holding a severed portion of the closure cap while driving the same through the opening; and FIG. 7 is a transverse sectional view, similar to that of FIG. 6, showing the step of collapsing or deforming such severed portion of the closure cap prior to removing the same through the opening.

The apparatus illustrated in FIG. 1 is designated in its entirety with the numeral 10, and includes support structure 11 which, in the particular form shown, is a circular plate of such thickness as to be rigid. Carried by the support structure or plate 11 are a plurality of circularity-enforcing devices in the form of rollers which total three in number and are respectively designated 12, 13 and 14. The rollers 12 and 13 are substantially identical, and each includes a cylindrical cap-engaging body portion 15 equipped at the lower end thereof with an outwardly projecting flage 16 constituting position-locating structure, as will be described in greater detail hereinafter. Each of the rollers 12 and 13 is rotatably supported by a pin or axle 17 that extends downwardly through the plate 11 and is secured along the underside thereof to the associated roller. It will be noted, especially in FIG. 2, that the rollers 12 and 13 are positioned with respect to the plate 11 so that a portion of each roller projects outwardly beyond the circumferential edge of the plate.

The roller 13 is generally similar to the rollers 12 and 13 and is rotatably supported along the undersurface of the plate 11. However, the roller 14 is bodily displaceable with respect to the plate 11 so as to selectively permit surface portions of the roller to project outwardly beyond the edge of the plate. In this respect, the roller 14 as shown in FIG. 5, constitutes a cylindrical cap-engaging body portion 17 equipped at the lower end thereof with an outwardly projecting flange 18, and provided centrally with a coaxial recess or opening within which is located a bearing 19 rotatably supporting the roller. The roller 14 is confined upon the bearing 19 by a fastener 20 which may take the form of a cap screw, as shown. Extending upwardly through the plate 11 is a pivot post 21 that is rigidly secured to the bearing 19 at a location offset from the axis of rotation of the roller 14. Accordingly, limited angular displacements of the pivot post 21 will cause the roller 14 and especially the axis of rotation thereof defined by the bearing 19, to be moved inwardly or outwardly relative to the circumferential edge of the plate 11.

Adjustment means are provided for selectively displacing the pivot post 21 angularly to effect such bodily displacements of the roller 14, and such adjustment means includes a crank arm 22 fixedly secured adjacent one end thereof to the post 21 so as to prevent relative movement therebetween. The adjustment means further includes a cube-shaped nut 23 pivotally related to the crank arm 22 adjacent the opposite end thereof as by means of a cap screw 24 (FIG. 5), and a threaded shaft or screw 25 that threadedly engages the nut 23 and extends therethrough, as shown best in FIG. 1. The screw 25 is elongated and projects through an L-shaped bracket 26 having one leg fixedly secured to the plate 11, as by means of cap screws, and which bracket has a nut 27 welded or otherwise anchored to the upwardly extending leg thereof that threadedly passes the shaft 25 therethrough.

To facilitate adjustment of the shaft 25, it is equipped with an enlarged head or hand grip 28 that may be serrated or otherwise roughened, as shown, for convenient gripping thereof. Evidently as the shaft 25 is turned in one direction, the nut 23 will be displaced outwardly therealong whereupon the crank arm 22 will cause the pivot shaft 21 to be displaced angularly in a counterclockwise direction as viewed in FIGS. 1 and 2 so that the roller 14 will be displaced in a counterclockwise direction to move it generally inwardly with respect to the plate 11. Whenever the shaft 25 is rotated in the opposite direction, the nut 25 will be moved inwardly therealong whereupon the crank arm 22 will cause the pivot shaft 21 and the roller 14 to be displaced in a clockwise direction as viewed in FIGS. 1 and 2 to move the roller outwardly relative to the plate 11. It may be noted that as shown in FIG. 2 the roller 14 approximates the extreme outer position thereof.

The support structure or plate 11 also carries a knife or cutting mechanism that is selectively movable between retracted and extended position, and it includes a cutting blade 29 having an enlarged body 30 that is substantially square-shaped in cross section and is slidably carried along the undersurface of plate 11 by a U-shaped bracket 31. The blade 29 is radially oriented with respect to the circular plate 11, and is slidably displaceable in radial directions within the limits defined by a pin 32 carried by the blade body 30 and a slot in the bracket 31 through which the pin extends. The blade is resiliently biased toward the inner retracted position thereof generally shown in FIG. 3 by a helical tension spring 33 secured at one end to the pin 32 and attached at its other end to a post 34 provided by the plate 11 along the undersurface thereof.

The blade 29 is displaceable outwardly against the biasing force of the spring 33 by displacement mechanism that includes a cam 35 constrained upon a pivot pin or shaft 36 so as to rotate therewith, and which pin extends upwardly through the plate 11 and is equipped along the upper surface thereof with a gear 37. The gear 37 is constrained upon the pin 36 on as to rotate therewith, and it is meshingly engaged by a drive gear 38 of reduced diameter mounted upon a shaft 39 extending upwardly through the plate 11 and equipped at its upper end with a handle 40 to facilitate rotation thereof.

It will be evident that as the shaft 29 is rotated in a clockwise direction as viewed in FIG. 2, the gear 37, pin 36 and cam 35 will be rotated in a counterclockwise direction, thereby permitting the spring 33 to retract the blade 29 toward the inner position thereof shown in FIG. 3. Rotation of the shaft 39 in the opposite direction will cause the gear 37, pin 36 and cam 35 to be displaced in a counter clockwise direction as viewed in FIG. 3 to force the blade 29 outwardly from the retracted position thereof in FIG. 3 into the extended position shown in FIG. 2.

The blade 29 is fixedly constrained in any position of adjustment thereof by a latch or dog 41 pivotally secured adjacent one end thereof to the plate 11 along its upper surface by a pivot pin 42. Adjacent its opposite end, the latch 41 is equipped with an ear 43 adapted to seat between adjacent teeth provided by the gear 37 so as to prevent rotation thereof in one direction, that is, in a clockwise direction as viewed in FIGS. 1 and 2. The latch 41 is resiliently biased into the tooth-engaging position thereof by a helical tension spring 44 secured adjacent one end to the latch and at its other end to the plate. Clearly, the latch 41 can be removed manually from engagement with the teeth of the gear 37 so as to enable the gear to be rotated in either direction.

The plate 11 is equipped with means for rotating or otherwise displacing the same angularly, and such means in the particular apparatus being considered includes a drive bolt 45' fixedly secured to the plate 11 and extending upwardly therefrom at its center. The drive bolt 35 is equipped at its upper end with a polygonal head 46' adapted to receive a wrench 47' thereon, as shown in FIG. 4, which wrench, for example, may be a speed wrench or ratchet wrench.

In use of the apparatus, the blade 29 is retracted and the roller 14 is displaced inwardly so as to enable all of the rollers to be placed within the cavity or recess 45 defined by a closure cap or lid 46, as shown in FIG. 4. The cap 46 provides the closure for a filler opening 47 (see FIG. 6) defined in the cover or head 48 of a container 49 in the form of a drum having a compartment 50 therewithin adapted to receive various materials which, quite often, are to be maintained in a sterile condition. The opening 47 is bordered by a circular rim 51 that is formed by turning or rolling a part of the head 48 upon itself, as is most clearly evidenced in FIG. 4. The cap 46 is disposed substantially contiguous relation with the rim 51, and is provided both above and below such rim with outwardly extending protuberances in the form of annular flanges 52 and 53 respectively located interiorly and exteriorly of the drum.

The cap 46 is evidently inserted into the opening 47 and then deformed so as to provide the outwardly projecting annular flange 52 underlying the rim 51 and, correspondingly, the flange 53 that overlies the same. As respects the present invention, the construction of the cap 46, opening 47, and head 48 and drum 49 may be completely conventional and in themselves form no part of the present invention. In any event, when the cap 46 is properly closing the opening 47, it has a cavity 45 that opens upwardly from the bottom closure wall 54 thereof; and as shown in FIG. 4, the rim 51 and flange 53 may be separated by a seal component 55 to hermetically close the compartment 50.

When completely within the cavity 45, the flanges 16 of the rollers 12 and 13 and flange 18 of the roller 14 are seated upon the bottom closure wall 54 of the cap 46, and are therefore in substantial alignment with the annular flange 52 of the cap so as to be receivable within the inwardly facing annular channel defined thereby, as shown in FIG. 4. The shaft 25 is then rotated to displace the adjustable roller 14 outwardly and into engagement with the generally ring-shaped area of the cap 46 in contiguous juxtaposition with the rim 51. Such movement of the roller 14 will cause all of the rollers to tightly abut such area of the cap, as illustrated in FIG. 2. Next, the support structure or plate 11 is rotated by means of a wrench 47' applied to the shaft 45' (as shown in FIG. 4), whereupon the circle defined by the three outermost points along the body portions of the rollers 12, 13 and 14 enforces a condition of circularity onto the cap 46 throughout the ring-shaped area thereof in engagement with the rim 51.

Subsequent to such rotation of the support structure 11, or perhaps prior thereto, the blade 29 of the cutting mechanism is displaced outwardly by appropriate rotation of the shaft 29 to bring the blade into cutting engagement with the cap 46, as shown in FIGS. 2 and 4. Rotation of the support structure 11 then will cause the blade 29 to describe a circular cut along the ring-shaped area of the cap 46, and the depth of such cut is increased as necessary by periodic adjustment of the blade to further displace it outwardly. This procedure is continued until the cap is either completely severed or is cut to such depth that the upper portion 46a thereof (FIG. 6) can be separated by flexing thereof from the lower portion 46b.

It will be observed in FIG. 4 that the location at which such cutting of the cap 46 is effected is generally along the mid-portion of the ring-shaped area thereof or slightly above such location so as to leave a sufficient area of the lower portion 46b of the cap in tight frictional engagement with the rim 51 so that such lower portion of the cap will not fall into the compartment 50 of the drum. Also, the condition of circularity enforced upon the cap 46 by the rollers 12 through 14 results in a rather precise severance of the cap so that the blade 29 of the cutting mechanism does not project through the cap and cut or otherwise damage the rim 51 at any location therealong.

After the cap 46 has been sub-divided into the upper and lower portions 46a and 46b, the latch 41 is pivoted outwardly so as to release the gear 37, and the shaft 39 is rotated in a direction permitting the spring 33 to retract the blade 29 from engagement with the cap. The threaded shaft 25 and is then rotated in a direction causing the roller 14 to be swung inwardly, whereupon the apparatus 10 can be removed from the cap 46. The upper portion 46a of the cap can then be removed from the rim 51 if it is still in position thereon, or such removal of the portion 46a can be effected after the lower portion 46b of the cap is removed.

In this respect, it is desired to remove the lower portion 46b of the cap without permitting the same to contaminate the interior of the drum, and such removal of the lower portion 46b includes displacing the same inwardly to free it from the opening while holding the lower portion to prevent it from falling into the container, and then deforming or collapsing the lower portion of the cap to reduce the size thereof and permit it to be withdrawn through the opening 47. The step of displacing the cap portion 46b downwardly while holding it is illustrated in FIG. 6, and may be accomplished by magnet structure that includes a pair of offset magnets 56 and 57 that are interconnected by a generally U-shaped rod 58. This assembly is useful in the common case of the drum being formed of a ferrous metal, and the magnet 56 is simply placed in position upon the transverse wall 54 of the cap 46 and pressed downwardly to displace the cap portion 46b from the frictional grip of the rim 51. Engagement of the magnet 57 with the head 48 of the drum causes the cap portion 46b to be held just below the head 48 (as shown in FIG. 6) because of the rigid character of the rod 58.

Next, the cap portion 46b is deformed by gripping the same (as shown in FIG. 7) as by means of a pliers-type compression tool having jaw or gripper elements 59 and 60 that can extend downwardly through the opening 47 so as to grip the cap portion 46b. The jaw elements 59 and 60 form part of elongated levers that are pivotally interconnected at 61 so as to form handle elements 62 and 63 that are coupled at their upper ends by an adjustable tension strap 64 — the length of which can be shortened so as to draw the handle elements 62 and 63 toward each other and thereby cause the jaw elements 59 and 60 to deform or collapse the cap portion 46b, as shown in FIG. 7. Such collapsing of the cap portion 46b reduces the size thereof sufficiently to enable it to be withdrawn through the opening 47. The magnet 56 may be removed from engagement with the cap portion 46b as soon as it is suitably gripped by the compression tool or it can be maintained in engagement with the lower cap portion until it is removed from the opening.

Thus, the method and apparatus enable a cap-equipped container to be opened conveniently and easily without damage to the container so that it can be reused and without contaminating the interior of the container and the contents thereof, which is important in many instances in which the contents of the container must be maintained in a sterile condition. The circularity enforced upon the ring-shaped area of the cap and circumjacent portion of the rim 51 in engagement therewith is sufficiently adequate to ordinarily prevent damage to any coating that may be provided along the inner surfaces of the drum either to protect it from its contents or to protect such contents from the drum itself.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. In a method of removing the closure cap from a drum or the like having an annular rim-equipped opening through which the cap extends and within which it is confined in substantially contiguous relation with the rim by laterally extending protuberances disposed along opposite sides thereof both interiorly and exteriorly of the drum, the steps of enforcing substantial circularity upon said cap intermediate said protuberances along the ring-shaped area thereof contiguous with said rim by means inside the cap and cutting said cap along a circular line located within such area of circularity to separate said protuberances from said cap along one side of said rim to enable said cap to be removed from said opening.

2. The method of claim 1 in which said cap is cut along a circular line adjacent the outside of said rim, and including the further step of displacing the portion of the cap remaining within said opening downwardly therethrough and into the interior of said drum.

3. The method of claim 1 in which said cap is cut along a circular line adjacent the outside of said rim, and including the further step of deforming the portion of said cap remaining within said opening to retract at least certain of the protuberances underlying said rim within the interior of said drum to enable such portion of the cap to be withdrawn through said opening.

4. The method of claim 1 in which said cap is cut along a circular line adjacent the outside of said rim, and including the further steps of displacing the portion of the cap remaining within said opening downwardly therethrough while at the same time holding such portion of the cap to prevent it from falling freely into the interior of said drum, and gripping and deforming such portion of the cap to retract at least certain of the protuberances formerly underlying said rim to enable the cap to be withdrawn through said opening.

5. The method of claim 1 in which the step of cutting said cap is effected while continuously maintaining the circularity thereof.

6. The method of claim 5 in which said cap is cut along a circular line adjacent the outside of said rim, and including the further step of deforming the portion of said cap remaining within said opening to retract at least certain of the protuberances underlying said rim within the interior of said drum to enable such portion of the cap to be withdrawn through said opening.

7. The method of claim 6 and including the further steps of displacing the portion of the cap remaining within said opening downwardly therethrough while at the same time holding such portion of the cap to prevent it from falling freely into the interior of said drum, and gripping and deforming such portion of the cap to retract at least certain of the protuberances formerly underlying said rim to enable cap to be withdrawn through said opening.

* * * * *

UNITED STATES PATENT OFFICE
CERTIFICATE OF CORRECTION

Patent No. 3,740,824   Dated June 26, 1973

Inventor(s) EVANS, LLEWELLYN W., Deceased by Agnes J. Evans, Executrix

It is certified that error appears in the above-identified patent and that said Letters Patent are hereby corrected as shown below:

On the Title page insert --Assignee: Rheem Manufacturing Company, New York, N. Y. --.

Signed and sealed this 29th day of January 1974.

(SEAL)
Attest:

EDWARD M. FLETCHER, JR.
Attesting Officer

RENE D. TEGTMEYER
Acting Commissioner of Patents